(12) United States Patent
Stadelmann et al.

(10) Patent No.: US 10,414,062 B2
(45) Date of Patent: Sep. 17, 2019

(54) DEVICE AND KIT FOR CUTTING A FLAT FOOD PRODUCT TRANSVERSE TO A CONVEYANCE DIRECTION

(71) Applicant: Hochland SE, Heimenkirch (DE)

(72) Inventors: Franz Stadelmann, Opfenbach (DE); Andreas Biggel, Hergatz (DE); Claudio Polizzi, Gestratz (DE); Thomas Zipper, Oberreute (DE); Michael Wilhelm, Oberstaufen (DE); Mario Iblher, Heimenkirch (DE)

(73) Assignee: Hochland SE, Heimenkirch (DE)

( * ) Notice: Subject to any disclaimer, the term of this patent is extended or adjusted under 35 U.S.C. 154(b) by 409 days.

(21) Appl. No.: 14/960,014

(22) Filed: Dec. 4, 2015

(65) Prior Publication Data
US 2016/0158954 A1    Jun. 9, 2016

(30) Foreign Application Priority Data
Dec. 4, 2014    (DE) .......................... 10 2014 117 850

(51) Int. Cl.
*B26D 1/36* (2006.01)
*B26D 7/26* (2006.01)
(Continued)

(52) U.S. Cl.
CPC ............ *B26D 7/2635* (2013.01); *A01J 27/00* (2013.01); *A01J 27/04* (2013.01); *B26D 7/0625* (2013.01);
(Continued)

(58) Field of Classification Search
CPC . B26D 1/36; B26D 1/365; B26D 1/38; B26D 1/385; B26D 1/40; B26D 1/405;
(Continued)

(56) References Cited

U.S. PATENT DOCUMENTS

| 391,949 A | 10/1888 | Cottrell |
| 1,606,324 A * | 11/1926 | Short ................. A01D 34/8355 172/552 |

(Continued)

FOREIGN PATENT DOCUMENTS

| BE | 568760 A | 2/1985 |
| DE | 102012001837 A1 | 8/2013 |

(Continued)

*Primary Examiner* — Evan H MacFarlane
(74) *Attorney, Agent, or Firm* — Robert Lelkes (57) ABSTRACT

A transverse cutting roller 1 for the transverse cutting of a flat product moving in a transport direction, in particular a viscous foodstuff, such as industrially produced cheese 14, wherein a transverse cutting blade 3, which bridges the product, which is intended to be cut, transversely to the transport direction, is held on a carrier shaft 2 by a plurality of axially spaced blade carriers 4 mounted on the carrier shaft 2, wherein each blade carrier has at least one carrier element 7, which extends radially outward with respect to the rotational axis A of the carrier shaft 2 when the blade carrier 4 is installed, wherein provided on the outer end of each carrier element 7 is a blade attachment section 5, on which the strip-type blade is detachably attached so as to be radially spaced from the carrier shaft 2.

15 Claims, 5 Drawing Sheets

(51) Int. Cl.
  *A01J 27/00* (2006.01)
  *B26D 7/06* (2006.01)
  *A01J 27/04* (2006.01)
(52) U.S. Cl.
  CPC ............ *B26D 7/2614* (2013.01); *B26D 1/365* (2013.01); *B26D 2007/2692* (2013.01)
(58) Field of Classification Search
  CPC ........ B26D 1/42; B26D 1/425; B26D 7/2642; B26D 7/2614; B26D 7/2628; B26D 2007/2692; B26D 2007/2664; B26D 1/62; B26D 1/626; B26D 3/22; B26D 3/225; B26D 7/26; B26D 7/2621; B26D 7/2635; Y10S 83/906; Y10S 83/932; A01J 27/00; A01J 27/04; A01J 25/008; Y10T 83/4827; Y10T 83/9394; Y10T 83/906
  USPC ................ 83/906, 632; 144/117.1, 172, 174; 241/282.1, 282.2
  See application file for complete search history.

(56) References Cited

U.S. PATENT DOCUMENTS

| | | | | |
|---|---|---|---|---|
| 1,867,884 A | | 7/1932 | Ernest | |
| 1,943,752 A | * | 1/1934 | Wick | B26D 3/02 83/158 |
| 3,068,731 A | * | 12/1962 | Schultz | B23D 25/12 83/305 |
| 3,230,809 A | * | 1/1966 | Luck | B26D 1/626 83/341 |
| 3,688,624 A | * | 9/1972 | Covey | B02C 18/144 83/355 |
| 3,769,866 A | * | 11/1973 | Pietrucci | A24B 7/06 83/302 |
| 3,857,314 A | * | 12/1974 | Gregoire | B26D 1/405 83/346 |
| 4,500,042 A | * | 2/1985 | Goertz | A01F 29/095 241/238 |
| 4,589,863 A | * | 5/1986 | Hodges | B26D 7/2614 493/471 |
| 5,573,805 A | * | 11/1996 | Fager | A01J 25/00 426/512 |
| 5,893,314 A | * | 4/1999 | Kapolnek | B26D 7/2614 83/698.41 |
| 2011/0226102 A1 | | 9/2011 | Biggel et al. | |

FOREIGN PATENT DOCUMENTS

| | | |
|---|---|---|
| JP | S5395478 A | 8/1978 |
| JP | S5511887 U | 1/1980 |
| JP | H04115897 A | 4/1992 |
| WO | 2012121228 A1 | 9/2012 |

* cited by examiner

DEVICE AND KIT FOR CUTTING A FLAT FOOD PRODUCT TRANSVERSE TO A CONVEYANCE DIRECTION

CROSS-REFERENCE TO RELATED APPLICATIONS

This application claims priority under the Paris Convention based on German patent application no. 102014117850.5 filed on Dec. 4, 2014.

BACKGROUND OF THE INVENTION

Field of the Invention

The invention relates to a transverse cutting roller for the transverse cutting of a flat food product, such as industrially produced cheese, which is moved in a transport direction, wherein held on a carrier shaft is a transverse cutting blade, which bridges the food product, which is intended to be cut, transversely to the transport direction. The invention also relates to a transverse cutting system and to a transverse cutting device, each of which comprises such a transverse cutting roller.

Description of Related Art

Devices for the transverse cutting of band-shaped products have been known for a long time in various embodiments, for example from DE 10 2012 001 837 or DE 10 2008 061 330. U.S. Pat. No. 5,573,805 shows a complete system for producing a foodstuff, which is cut into pieces or sticks, in particular a processed-cheese band. In devices of this type, an initially wide product band is cut parallel to the transport direction, first into a plurality of strips lying next to one another, before these are fed, in the transport direction by means of a conveyor belt, to the transverse cutting device. The strips are then transversely cut by mean of one cut, which is carried out substantially transversely to the transport direction.

Such devices for transverse cutting usually comprise a transverse cutting roller, on which a transverse cutting blade disposed substantially parallel to the rotational axis of the carrier shaft is attached. The expression "substantially parallel" includes a slightly angled orientation of the transverse cutting blade relative to the rotational axis.

Particularly high demands on cleanliness are placed specifically on the processing of foodstuffs, and therefore also on the processing of industrially produced cheese. In particular, it must be possible, in principle, to easily and effectively clean the machine parts coming into contact with the product. With such devices it is therefore necessary to avoid hard-to-reach gaps or intermediate spaces in which product residue collects. In addition, the individual components should also be easy to (de)install for cleaning purposes.

As is known, transverse cutting blades and transverse cutting rollers are therefore designed as separate components. The blade, which is designed as a wear part, can therefore be conveniently replaced and/or cleaned. For the purpose of installing the transverse cutting blade, a recess in which the transverse cutting blade is held is provided in the transverse cutting roller. In order to provide a defined hold, this recess comprises suitable contact surfaces, whereby the position and the orientation of the transverse cutting blade are fixedly predefined. The known transverse cutting devices are limited to a single application, however, in particular the cutting of a certain product having a specified thickness and consistency. Changing the product is accompanied by considerable retooling measures.

The problem addressed by the present invention is therefore that of developing a transverse cutting roller and a transverse cutting device, which preferably comprises a small number of components, which are easy to install and are therefore easy to clean, and offers a high degree of flexibility for a broad scope of applications, in particular for cutting different qualities and dimensions of products. These problems are solved by the present invention described below.

SUMMARY OF THE INVENTION

One aspect of the present invention is a transverse cutting roller (1) for the transverse cutting of a flat product moving in a transport direction, in particular a viscous foodstuff, such as industrially produced cheese (14), comprising a carrier shaft (2) rotatable about a rotational axis (A), at least one transverse cutting blade (3) and a plurality of blade carriers (4), wherein each transverse cutting blade (3) is held on the carrier shaft (2) by the plurality of blade carriers for cutting a flat product transversely to a direction of transport, wherein each blade carrier (4) has an opening adapted for passage of the carrier shaft (2) through the blade carrier (4), the plurality of blade carriers (4) are mounted on the carrier shaft (2) at axially spaced apart locations relative to each other, each blade carrier (4) comprises at least one carrier element (7) extending radially outward with respect to the rotational axis (A) of the carrier shaft (2), wherein the outer end of each carrier element (7) comprises a blade attachment section (5) adapted for detachably attaching the transverse cutting blade at a location which is radially spaced from the carrier shaft (2) and each blade carrier (4) is pivotable about the rotational axis (A) of the carrier shaft and further comprises a fixing device for selectively affixing the blade carrier (4) to the carrier shaft to prevent rotation of the blade carrier relative to the carrier shaft (2) for selectively fixing the position of the transverse cutting blades mounted on the blade carrier relative to the carrier shaft.

Another aspect of the present invention is a kit of parts for assembling a transverse cutting device according to any one of the preceding claims, comprising a carrier shaft (2), one or more strip-type blades (3) and a plurality of blade carriers (4) for attaching a blade (3) on the carrier shaft, wherein each blade each blade carrier (4) has an opening adapted for passage of the carrier shaft (2) through the blade carrier (4), is pivotable about the rotational axis (A) of the carrier shaft when threaded onto the carrier shaft and comprises at least one carrier element (7) extending radially outward with respect to the rotational axis (A) of the carrier shaft (2), wherein the outer end of each carrier element (7) comprises a blade attachment section (5) adapted for detachably attaching the transverse cutting blade at a location which is radially spaced from the carrier shaft (2), and a fixing device for selectively affixing the blade carrier (4) to the carrier shaft to prevent rotation of the blade carrier relative to the carrier shaft (2) for selectively fixing the position of the transverse cutting blades mounted on the blade carrier relative to the carrier shaft.

A further aspect of the present invention is a method for cutting a flat food product transverse to a transport direction comprising:

(a) Transporting a flat food product in a transport direction and (b) Cutting the flat food product in a direction transverse to the transport direction with a transverse cutting device (1) according to any one of claims 1 to 7.

BRIEF DESCRIPTION OF THE DRAWINGS

The invention is exemplified in the following illustrative figures.

DETAILED DESCRIPTION OF THE INVENTION

According to one embodiment of the invention, a plurality of blade carriers are mounted on a carrier shaft. Each blade carrier is adapted to mount or hold a transverse cutting blade. The transverse cutting blade is preferably a strip-type blade. Each blade carrier is preferably detachably and/or removably mounted on the carrier shaft and the transverse cutting blade is preferably detachably and/or removably mounted on the blade carriers. Different blade carriers and blades can be provided depending on the intended use. The terms "blade" and "transverse cutting blade" are used synonymously herein. This system comprising the carrier shaft, a set of blade carriers, and at least one blade not only ensures maximum flexibility in being adaptable to any circumstances by a simple replacement of one or more components, such a transverse cutting roller also meets the highest standards for cleanliness and is very easy to repair.

According to a preferred embodiment of the invention, the transverse cutting roller comprises at least one transverse cutting blade, which is preferably detachably and/or removably held by means of the blade carriers, which are axially spaced and preferably detachably and/or removably mounted on the carrier shaft. The number of blade carriers depends on the requirements for the stability of the transverse cutting blade. Each blade carrier preferably comprises at least one carrier element which, when the blade carrier is installed, extends substantially radially outward with respect to the rotational axis of the carrier shaft. If one blade carrier has a plurality of carrier elements, these are preferably symmetrically disposed radially about the circumference of the carrier shaft in order to avoid out-of-balance conditions. These protruding carrier elements preferably result in a star-shaped design of the blade carrier. A blade attachment section on which the transverse cutting blade is preferably removably mounted so as to be radially spaced with respect to the carrier shaft is preferably provided on the outer circumference of each carrier element. The way that each transverse cutting blade is held by a carrier element may be set via the design of the blade attachment sections, in particular via the contact angle of the carrier element.

One aspect of the invention is therefore the modularity due to the structural separability of the transverse cutting blade and the carrier shaft and, in particular, the blade carriers which, as the connecting means, form an "adapter" between the transverse cutting blade and the carrier shaft. Due to the use of the blade carriers, the transverse cutting blade and the carrier shaft can be designed independently of one another. Standard components can be used as the carrier shaft and/or the transverse cutting blade, which are low-cost and easy to replace. Only the blade carriers need to be adapted to suitable transverse cutting blades and suitable carrier shafts, whereby even transverse cutting devices having a complex geometry can be assembled from simple components. In particular the number of transverse cutting blades on the transverse cutting roller and the insertion angle of the blade into the product can be defined by means of the blade carrier. Via the specification of these parameters, the device can be flexibly and conveniently adjusted to various product types and dimensions, and for various processing speeds.

Advantageously, the blade carriers are designed as one piece with the carrier elements. The position and orientation of the blade are adjusted by selecting a suitable set of blade carriers from a predefined assortment. Due to the use, according to the invention, of such blade carriers as adapters between the transverse cutting blade and the carrier shaft, an additional adjustability and, therefore, the associated cleaning problems become largely obsolete.

In order to facilitate the convenient attachment of the blade carriers and the blade, the blade carriers advantageously have a blade attachment section, on which the blade is fastened, and a shaft attachment section, at which the blade carrier is fastened on the carrier shaft. Preferably, the shaft attachment section is designed as one piece with the blade attachment section. To this end, an integrally formed carrier element can be provided between these two sections, which carrier element connects the blade attachment section to the shaft attachment section. This one-pieced design enables the blade carrier to be easily and effectively cleaned.

In a particularly advantageous embodiment, the blade carriers can pivot about the rotational axis of the carrier shaft and can each be fixed on the carrier shaft at a defined attachment angle by means of a fixing means, for example a fixing screw. In order to make this possible, it is advantageous to design the blade carrier, in particular the shaft attachment section thereof, as a ring enclosing the carrier shaft, thereby enabling the blade carriers to be "lined up" on the carrier shaft. In an advantageous embodiment, the carrier elements are then integrally formed on the rings in the shape of a star. If the arrangement of the carrier elements results in an out-of-balance condition during rotation of the transverse cutting roller, elements for balancing, for example in the form of balancing rings, can be installed onto the carrier shaft.

Due to the pivotability and/or rotatability of the blade carrier, the angular orientation of the blade with respect to the rotational axis of the carrier shaft can be adjusted. The angle makes it possible to carry out a shearing or pulling cut at the counter-blade and, therefore, to avoid a chopping cut, which particularly stresses the bearings. In addition, the preferred modular concept and the use of similar components makes it possible to produce a plurality of different transverse cutting devices, which differ from one another in terms of the angular orientation of the transverse cutting blade with respect to the rotational axis.

Corresponding to the annular fastening sections, at least some sections of the carrier shaft are cylindrical. This permits the shaft attachment section to rotate with respect to the carrier shaft.

In the simplest case, the entire carrier shaft is cylindrical, which facilitates an axial displaceability of the blade carrier on the carrier shaft and therefore facilitates threading the blade carriers over the carrier shaft and adjusting axial displacement of the same. The blade carrier on the carrier shaft may be fixed in the axial direction and/or in the circumferential direction via a fixing device, such as fixing screws.

It is particularly advantageous to predefine one or multiple defined angles for the attachment of the transverse cutting blade. This may be carried out by specifying one or multiple attachment position(s) on the carrier shaft, which are defined in terms of axial spacing and angle of rotation, for each of the blade carriers relative to the next adjacent blade carriers, wherein a corresponding receptacle is formed in the carrier shaft at each attachment position for a defined insertion of the fixing device. Preferably, the receptacles are simple blind holes in which suitable fixing screws are accommodated. The fixing screws can therefore be interlockingly positioned and held on the carrier shaft. The fixing screws are held on the blade attachment section in threaded holes, so that the blade carrier can be easily installed on the carrier shaft in a specified orientation.

In order to mount the blade at specific angles relative to the rotational axis of the carrier shaft, it is advantageous to provide a one or more groups of receptacles in the surface of the carrier shaft arranged to obtain a desired blade angle. The receptacles of each group may be arranged on a line, wherein each line forms a helix. The rotational position of the blade carrier and, therefore, the angle of the transverse cutting blade with respect to the rotational axis may be adjusted by selecting an appropriate group of receptacles. Therefore, the transverse cutting blade can be easily and precisely installed on the carrier shaft with the desired angular offset.

By providing groups of attachment points, the installer is offered a plurality of helical arrangements, each of which is associated with a different angle of helical twist. By selecting an appropriate helical "attachment group line" for attachment of the respective blade carriers, the installer automatically implements the angle of helical twist without the need to use a measuring instrument. The set-up of the carrier shaft can therefore be substantially simplified. Preferably, the groups of receptacles are disposed at an angle of helix twist of between 0 and 5, more preferably in the range from 1 to 5, and even more preferably in the range from 1 to 4, degrees angle of rotation centered on the axis of rotation of the carrier shaft and measured between the first and last receptacle of each group of receptacles starting from one end of the carrier shaft and ending at the other end of the carrier shaft, which angle of twist is therefore assumed by each blade mounted on the carrier elements of the respective blade carriers.

The angle of twist is preferably the same for all blades of a transverse cutting roller having multiple blades. This result is preferably obtained by using blade carriers that are substantially identical to each other, particularly with regard to the placement of the carrier elements of each blade carrier.

A preferred aspect is that the blade carriers are designed in such a way that the pitch angle at which the cutting edge of the blade enters the product is optimized. To this end, the blade attachment section has a contact surface for the defined placement of the blade, wherein the contact surface is situated at an inclination angle, which is slanted with respect to the direction of rotational travel of the blade about the rotational axis of the carrier shaft. Different sets of blade carriers can have differently slanted contact surfaces, each of which is optimized for cutting a certain product. The discharge behavior of the transverse cutting blade can also be adjusted depending on the product by means of the differently slanted contact surfaces and the correspondingly different pitch angles. In addition, different blades can also be provided for different products. In order to adjust the cutting gap in a defined manner along the entire length of the blade and therefore achieve a clean cut at the juncture between the blade and the counter-blade, it can be advantageous to adjust the spacing using flat adjustment disks, which are disposed between the blade and the contact surface. For the purpose of simple and effective cleaning, these adjustment disks are enclosed by sealing rings in order to close the resultant gap.

The transverse cutting roller according to the invention is particularly suitable for cutting a soft food band having a defined thickness. In order to ensure that the food band has already been cut and carried away before the blade carrier can enter the material band, the cutting edge of the blade is disposed so as to protrude beyond the blade carrier in the circumferential direction by a certain amount, which is greater than the material thickness.

In this case, a soft food band is understood to be foodstuffs, which readily yield during cutting, undergoing an elastic or plastic change in shape. The dimensional stability of the food to be cut is still so low at the instant of cutting that increased attentiveness is required to maintain the shape. In particular, cutting carried out with incorrectly adjusted cutting gaps can result in fraying of the cut edges, which can be undesired. The cutting gap is preferably adjustable with an accuracy of up to 0.05 mm, specifically when cutting bands of processed cheese or mozzarella. The requirements placed on a cutting tool for cutting another foodstuff, for example, hard chocolate, may deviate entirely from this.

Even the highest requirements on cleanliness, such as those specified by the U.S. agencies, for example, can be easily met with the transverse cutting roller according to the invention. In addition, the modular design enables a simple and optimized adaptation of the transverse cutting roller to products having extremely different properties and/or to production processes having a different speed.

Therefore, a preferred aspect of the invention is a transverse cutting system for the modular design of a transverse cutting roller comprising a carrier shaft, one or multiple transverse cutting blades and at least two sets of blade carriers for fastening a blade on the carrier shaft. The blade carriers of the particular sets differ in terms of the number of carrier elements and/or in terms of the inclination angle of the contact surfaces.

Such a transverse cutting system can be installed in a transverse cutting device for the transverse cutting of a viscous food band, which is fed in the transport direction, in particular a band of industrially produced cheese, which transverse cutting system may further comprise a device for conveying a flat product in a transport direction, such as a conveyor belt moving in the transport direction, in order to transport the food band toward, or under, a transverse cutting roller according to the invention, and a counter-blade, against which the product rests and against which the transverse cutting blade executes a shearing cut. Such a transverse cutting device may further comprise a longitudinal cutting device, such as blade roller, which is disposed upstream relative to the transverse cutting roller in the transport direction and initially cuts a wide food band, which is fed in the transport direction, in the longitudinal direction into a plurality of narrow food strips. The transverse cutting roller may be advantageously designed in such a way that said transverse cutting roller bridges all the food strips and then cuts all of them transversely, with one cut. The resultant food sticks or cubes may be carried away by a conveying device, such as a conveyor belt disposed underneath.

Figure 1:
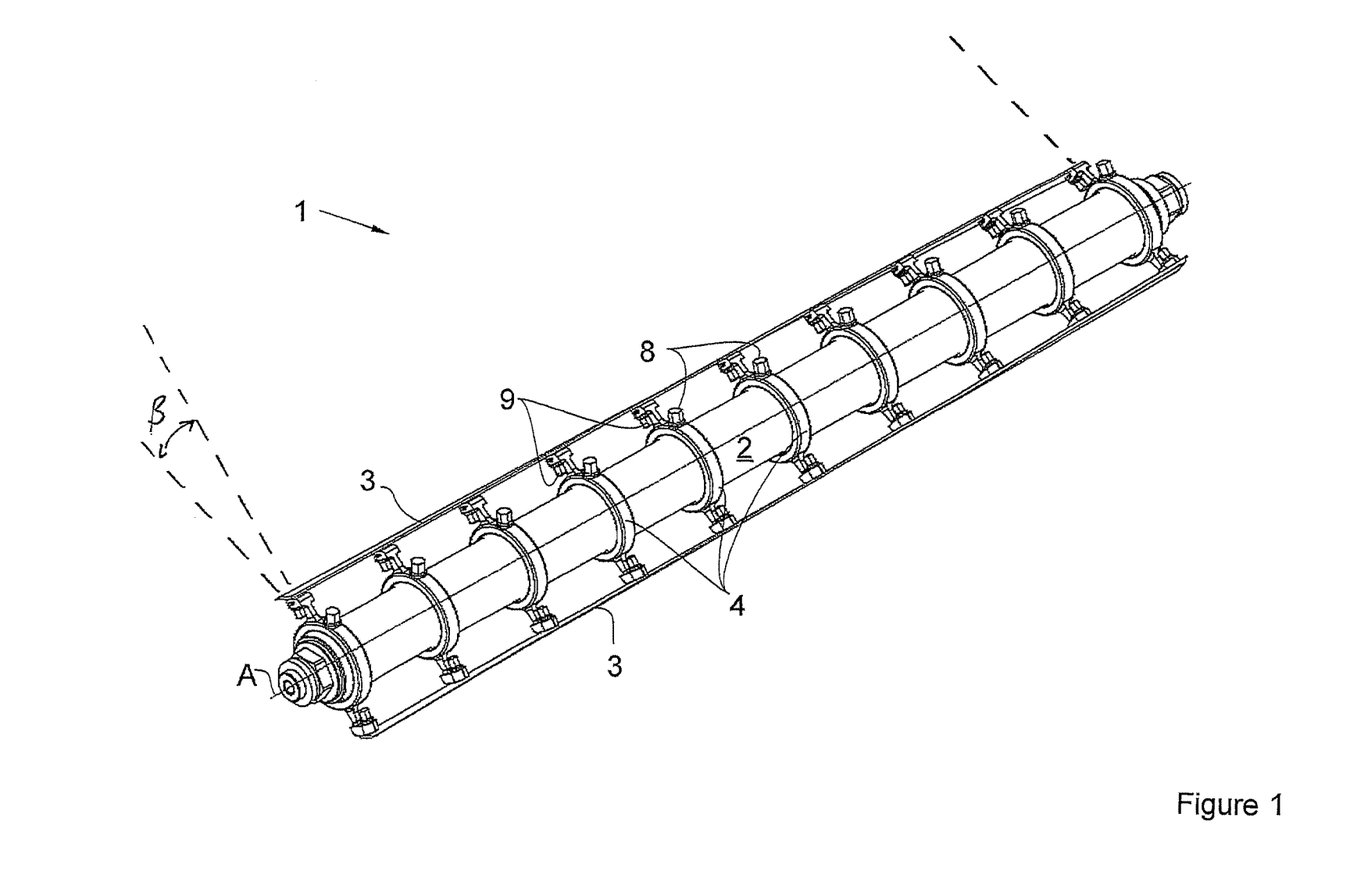
FIG. 1 shows a perspective illustration of a transverse cutting roller having two transverse cutting blades (blades) and multiple blade carriers.
Figure 2A:
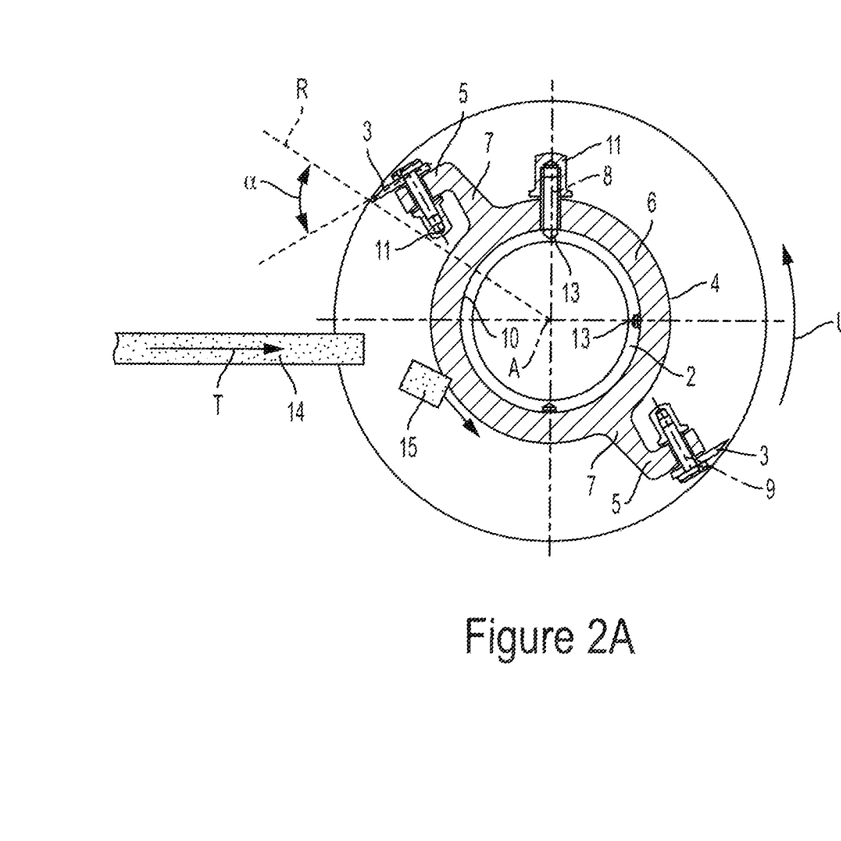
FIG. 2A shows a cross-sectional view of the transverse cutting roller according to FIG. 1 taken through a blade carrier.

FIGS. 1 and 2A disclose a transverse cutting roller 1, according to the invention, as part of a transverse cutting device 1. This transverse cutting device comprises a cylindrical carrier shaft 2 having a circular cross-section, which has a constant radius along the rotational axis A. In this case, two strip-type transverse cutting blades 3 (blades) are detachably mounted on the carrier shaft 2, wherein the transverse cutting blades 3 form a helix having a small twist angle ß about the rotational axis A. By means of such a transverse cutting roller 1, food bands 14 (FIG. 2A), which were conveyed in a transport direction T and were initially cut longitudinally, can be cut into food sticks 15.

Figure 2B:
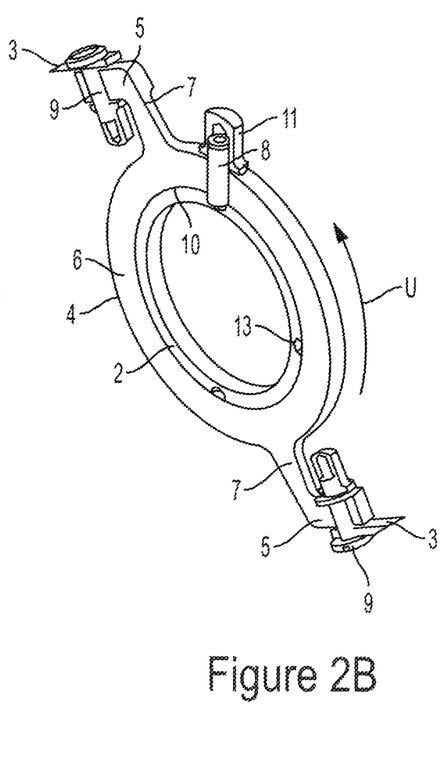
FIG. 2B shows a perspective view of the blade carrier.

The transverse cutting blades 3 are detachably attached on the carrier shaft 2 by means of a number—ten in this case—of blade carriers 4, which are designed as one piece and are lined up on the carrier shaft 2, axially adjacent to one another, and are likewise detachably attached. As illustrated in FIGS. 2A and 2B, the blade carriers 4 have a shaft attachment section 6, which forms a ring having a suitable hole 10, wherein the diameter of the hole 10 corresponds to the outer diameter of the carrier shaft 2. The shaft attachment section 6 and, therefore, the blade carrier 4, are rotatably held on the carrier shaft 2 by means of the hole. In this case, the blade carriers 4 also each have two carrier elements 7 which, when the blade carrier 4 is installed, extend radially outward relative to the rotational axis (A). Provided on the outer end of each carrier element 7 is a blade attachment section 5, on which the strip-type blade 3 is detachably attached so as to be radially spaced from the carrier shaft 2.

The shaft attachment section 6 and, therefore, the blade carrier 4 are fixed in the axial position and the rotational orientation thereof on the carrier shaft 2 by means of a fixing screw 8, which extends through a threaded hole of the blade carrier 4 in the radial direction toward the carrier shaft 2. A blade attachment section 5 is integrally connected to the shaft attachment section 6 via a carrier element 7 in each case. Blind holes 13, into which the fixing screws 8 engage, are provided in the surface of the carrier shaft 2. An intended position of the fixing screw 8 with respect to the carrier shaft 4 is therefore specified, which makes it easier for the installer to install the blade carriers correctly. The thread of the screwed connections 9 and of the fixing screws 8 are each covered by caps 11. These prevent contamination from collecting on the thread.

The blade attachment section 5 comprises a hole or a slot, which is used for a threaded connection 9 for attaching the transverse cutting blade 3 on the blade attachment section 5. The formation of slots at this point ensures that the transverse cutting blades can be oriented on the blade carriers without axial preload. The long side of the slot is oriented, in particular, parallel to the rotational axis A of the carrier shaft.

Figure 3:
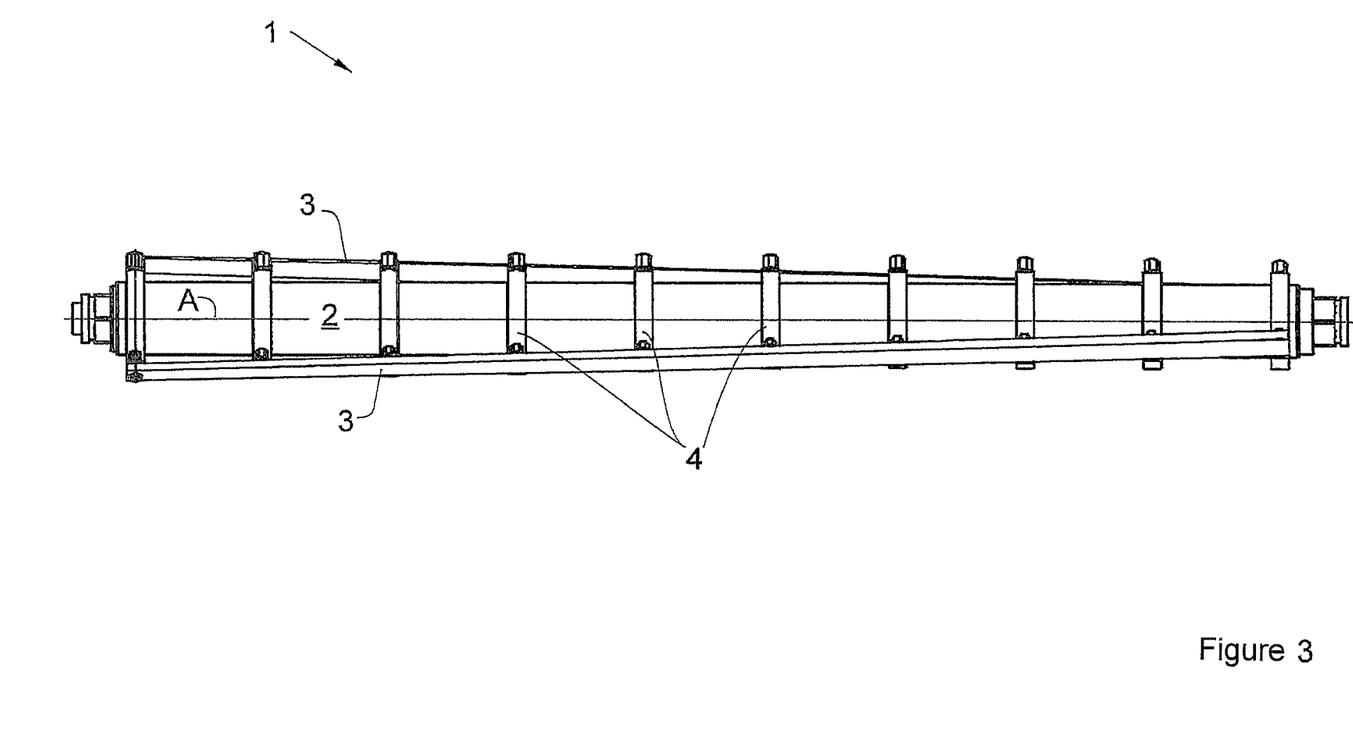
FIG. 3 shows a lateral view of a transverse cutting roller having spirally mounted blades.

When attaching the transverse cutting blade 3 on the carrier shaft 2, the transverse cutting blade 3 can be specifically installed on the carrier shaft 2 with a specified angular offset with respect to the rotational axis A. A corresponding arrangement having transverse cutting blades 3 disposed on the carrier shaft with rotational offset is shown in FIG. 3. To this end, the individual blade carriers 4 are mounted on the carrier shaft 2 in different angular positions relative to one another, which are specified in a defined manner. This is made possible by the pivotability of the shaft attachment section 6 with respect to the circular cross-section of the carrier shaft 2, which is complementary thereto. The adjusted rotational position of the blade carrier 4 on the carrier shaft 2 is fixed by means of the fixing screw 8.

Figure 4:
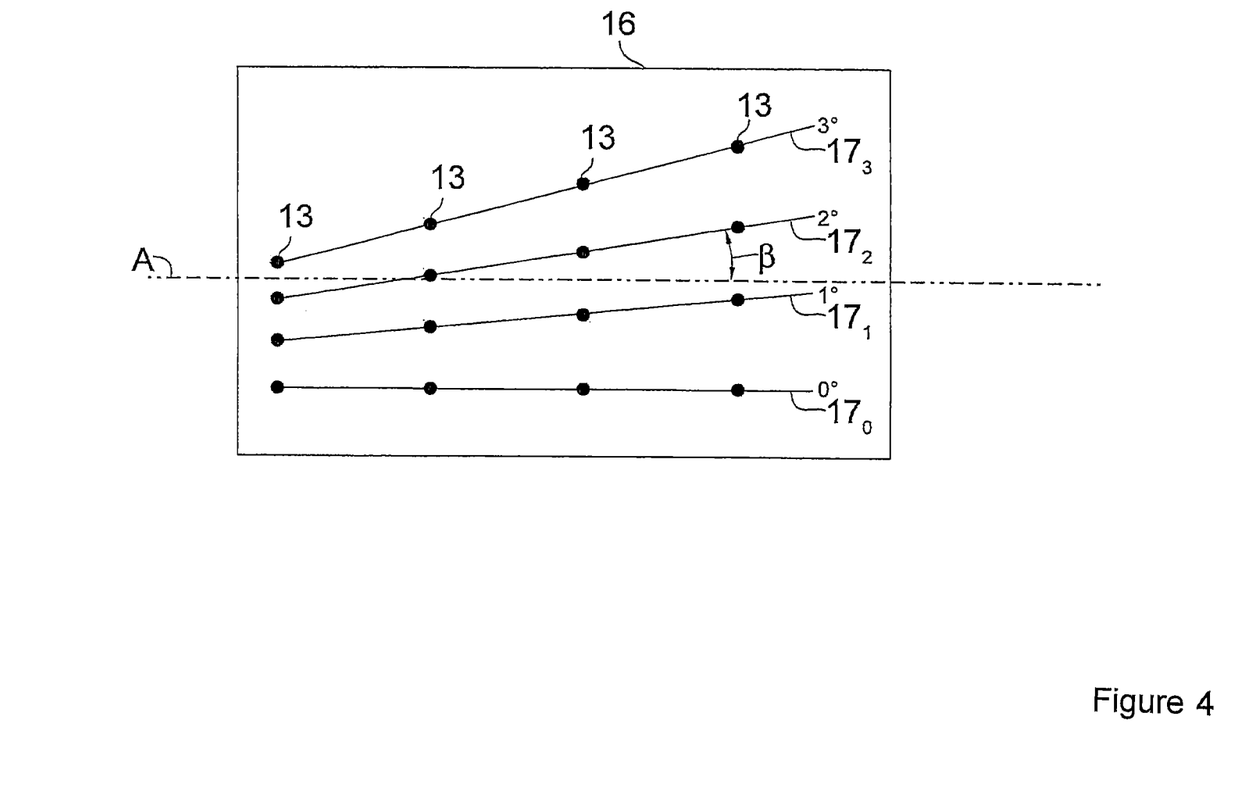
FIG. 4 shows a cut-out of a portion of the surface of the carrier shaft.

In order to install the transverse cutting blade on the carrier shaft 2 with a specified angle of twist, the surface of the carrier shaft 2 is provided with defined attachment points, which are formed by the receiving holes 13 in this case. FIG. 4 schematically shows a cut-out of part of the surface of the carrier shaft 2. A plurality of attachment points 13, which are disposed on common helical lines 17 in each case, is shown. Each helical line 17 has a specified helix angle with respect to the carrier shaft 2. If the transverse cutting blade 3 should then be installed on the carrier shaft with an angle of twist of 2° with respect to the rotational axis A, all the fixing screws 8 must be screwed into the receiving holes 13 located on a common "2°" helix line. The same applies for any other value of the angular offset.

Only four attachment points 13 per straight line 17 are shown in FIG. 4, by way of example. If the number of installed blade carriers is ten, one helix line therefore also comprises ten attachment points.

Figure 5A:
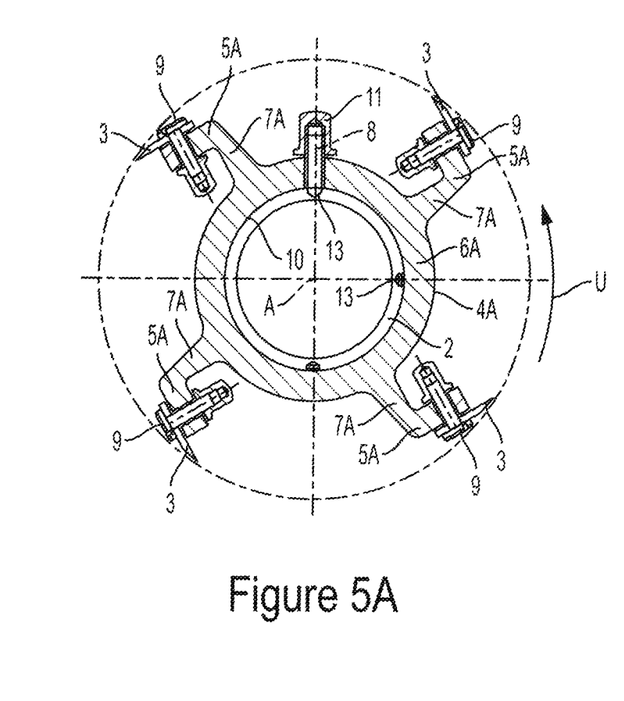
FIG. 5A shows a cross-sectional view of an alternative blade carrier for the attachment of four transverse cutting blades.
Figure 5B:
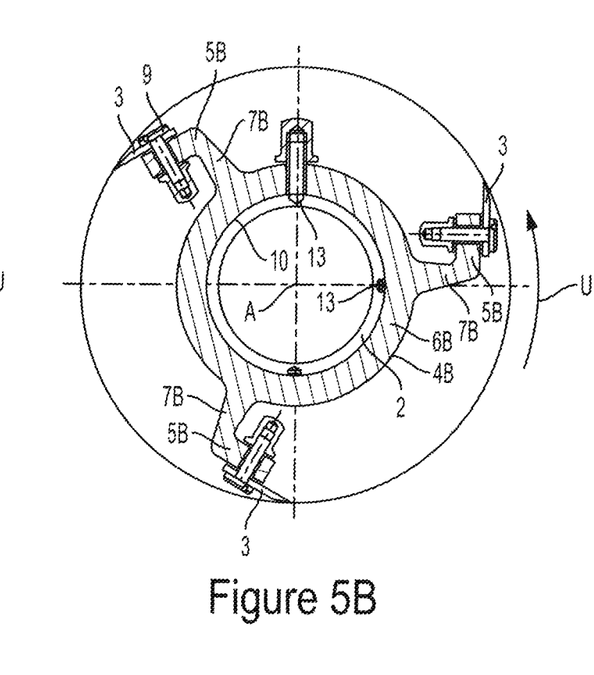
FIG. 5B shows a cross-sectional view of an alternative blade carrier for the attachment of three transverse cutting blades.

Further embodiments of a blade carrier 4 are illustrated in FIGS. 5A and 5B. Whereas the blade carrier 4 in FIG. 2 comprises two blade attachment sections 5 and, therefore, two carrier elements 7, the number of blade attachment sections is variable. For example, the blade carrier 4A illustrated in FIG. 5A comprises four blade attachment sections 5A on four carrier elements 7A extending from shaft attachment section 6A. Therefore, four transverse cutting blades 3 can be installed on the carrier shaft 4A. No special adaptation of the carrier shaft 2 is required. A standard carrier shaft 2 can therefore be used for any number of transverse cutting blades 3. The blade carrier 4B illustrated in FIG. 5B has three blade attachment sections 5B on three carrier elements 7B extending from shaft attachment section 6B and can therefore hold three transverse cutting blades 3.

In this exemplary embodiment, the transverse cutting blades are oriented tangentially to the rotational axis A. The pitch angle α of the transverse cutting blade, including the angle between the transverse cutting blade 3 and the radial direction R (FIG. 2A) as viewed in the cross-section along the rotational axis A, is between 62° and 68°. If another pitch angle is desired, blade carriers may be used in which the orientation of the blade attachment section 5 with respect to the connecting section 7 deviates in a corresponding manner.

The spacing along the radial direction R of the blade attachment section 5 from the rotational axis A is illustrated in FIG. 2A. Only those blade carriers 4 for fastening the transverse cutting blade 3 thereof are used on a carrier shaft 2 which have blade attachment sections 5 which have identical radial spacings along the radial direction R from the rotational axis A.

LIST OF REFERENCE CHARACTERS 1 transverse cutting roller
2 carrier shaft
3 transverse cutting blade (blade)
4 blade carrier 5 blade attachment section
6 shaft attachment section
7 carrier element
8 fixing screw
9 threaded connection
10 hole
11 covering cap
12 slot
13 receiving hole
14 food band
15 food pieces
16 development of a part of the surface of the carrier shaft
17 straight line
T transport direction
A rotational axis
R radial direction
U circumferential direction
α pitch angle
ß angle of twist/helix angle

The invention claimed is:

1. A transverse cutting roller (1) for cutting a flat food product transverse to a transport direction comprising (a) a carrier shaft (2) rotatable about a rotational axis (A) comprising a plurality of receptacles (13) spaced apart circumferentially about the carrier shaft (2), (b) at least one transverse cutting blade (3) and (c) a plurality of blade carriers (4), wherein each transverse cutting blade (3) is held on the carrier shaft (2) by the plurality of blade carriers, wherein each blade carrier (4) has an opening adapted for passage of the carrier shaft (2) through the blade carrier (4),
the plurality of blade carriers (4) are mounted on the carrier shaft (2) at axially spaced apart locations relative to each other,
each blade carrier (4) comprises at least one carrier element (7) extending radially outward with respect to the rotational axis (A) of the carrier shaft (2) to an outer end, wherein the outer end of each carrier element (7) comprises a blade attachment section (5) adapted for detachably attaching one of the at least one transverse cutting blade at a location which is radially spaced from the carrier shaft (2),
each blade carrier (4) is pivotable about the rotational axis (A) of the carrier shaft and further comprises a fixing device (8) capable of engaging with one of the receptacles (13) in the carrier shaft for selectively affixing the blade carrier (4) to the carrier shaft to prevent rotation of the blade carrier relative to the carrier shaft (2) and for selectively fixing a position of the at least one transverse cutting blade mounted on the blade carrier relative to the carrier shaft,
the receptacles (13) are each adapted to engage with the fixing device (8) of one of the plurality of blade carriers (4) and the blade carriers (4) are axially spaced apart from each other at defined positions along the rotational axis (A) of the carrier shaft to facilitate engagement of the fixing device of each blade carrier (4) with one of the plurality of receptacles,
the receptacles (13) are distributed on the carrier shaft (2) in a plurality of groups comprising a first group and a second group, wherein the first group of receptacles (13) is aligned along the rotational axis (A) in the form of a straight line or helix having a first angle of zero degrees or greater between a first and a last receptacle (13) of the first group of receptacles (13) and the second group of receptacles (13) is aligned along the rotational axis (A) in the form of a helix having a second angle greater than zero degrees between a first and a last receptacle (13) of the second group of receptacles (13), and
the second angle is greater than the first angle.

2. The transverse cutting roller according to claim 1, wherein each transverse cutting blade (3) is a strip-type blade.

3. The transverse cutting roller according to claim 1, wherein the second angle is at least 1 degree greater than the first angle.

4. The transverse cutting roller according to claim 1, wherein the plurality of groups comprises a third group of receptacles (13) aligned in the form of a helix along the rotational axis (A) having a third angle between a first and a last receptacle (13) of the third group of receptacles (13), wherein the third angle is greater than the second angle.

5. The transverse cutting roller according to claim 4, wherein the first angle, the second angle and the third angle are each in thea range from 0 to 5 degrees.

6. The transverse cutting roller according to claim 1, wherein each blade carrier has a circumference and, for each blade carrier, the at least one carrier element comprises a plurality of carrier elements (7) evenly distributed circumferentially about the blade carrier.

7. The transverse cutting roller according to claim 1, wherein each blade attachment section (5) has a contact surface for the placement of one of the at least one transverse cutting blade, wherein the contact surface is situated at an inclination angle, which is slanted at an angle greater than zero relative to a direction of travel about the rotational axis (A) for defining a pitch angle at which a cutting edge of the blade enters a product.

8. A kit of parts for assembling a transverse cutting roller according to claim 1, comprising:
a carrier shaft (2) comprising a plurality of receptacles (13) spaced apart circumferentially about the carrier shaft (2),
one or more strip-type blades (3) and
a plurality of blade carriers (4) for attaching the one or more strip-type blades (3) on the carrier shaft (2),
wherein
each blade carrier (4) has an opening adapted for passage of the carrier shaft (2) through the blade carrier (4), is pivotable about a rotational axis (A) of the carrier shaft when threaded onto the carrier shaft and comprises at least one carrier element (7) extending radially outward with respect to the rotational axis (A) of the carrier shaft (2) to an outer end, wherein the outer end of each carrier element (7) comprises a blade attachment section (5) adapted for detachably attaching one of the one or more strip-type blades at a location which is radially spaced from the carrier shaft (2), and each blade carrier comprises a fixing device (8) capable of engaging with one of the receptacles (13) in the carrier shaft for selectively affixing the blade carrier (4) to the carrier shaft to prevent rotation of the blade carrier (4) relative to the carrier shaft (2) for selectively fixing a position of the one or more strip-type blades (3) mounted on the blade carrier (4) relative to the carrier shaft (2),
the receptacles (13) are each adapted to engage with the fixing device (8) of one of the plurality of blade carriers (4),
the receptacles (13) are distributed on the carrier shaft (2) in a plurality of groups comprising a first group and a second group, wherein the first group of receptacles (13) is aligned along the rotational axis (A) in the form of a straight line or helix having a first angle of zero degrees or greater between a first and a last receptacle (13) of the first group of receptacles (13) and the second group of receptacles (13) is aligned along the rotational axis (A) in the form of a helix having a second angle greater than zero degrees between a first and a last receptacle (13) of the second group of receptacles (13), and the second angle is greater than the first angle.

9. The kit according to claim 8, wherein the second angle is at least 1 degree greater than the first angle.

10. The kit according to claim 9, wherein the plurality of groups comprises a third group of receptacles (13) aligned in the form of a helix along the rotational axis (A) having a third angle between a first and a last receptacle (13) of the third group of receptacles (13), wherein the third angle is greater than the second angle.

11. The kit according to claim 8, wherein the plurality of blade carriers (4) comprises a first set of blade carriers (4) and a second set of blade carriers (4), each blade carrier of the first set having a first number of carrier elements (7), each blade carrier of the second set having a second number of carrier elements (7), wherein the second number of carrier elements (7) is different from the first number of carrier elements (7).

12. The kit according to claim 8, wherein each blade attachment section (5) has a contact surface for the placement of one of the one or more blades, wherein the contact surface is situated at an inclination angle, which is slanted at an angle greater than zero relative to a direction radial to the rotational axis (A) for defining the pitch angle at which a cutting edge of the blade enters a product.

13. The kit according to claim 12, wherein the plurality of blade carriers (4) comprises blade carriers (4) having contact surfaces with different inclination angles.

14. The kit according to claim 8 wherein the first angle and the second angle are each within a range from 0 degrees to 5 degrees and differ from each other by at least 1 degree.

15. A method for cutting a flat food product transverse to a transport direction comprising:
(a) assembling a kit of parts according to claim 8 to make a transverse cutting roller (1);
(b) transporting a flat food product in a transport direction toward the transverse cutting roller of (a) and (b) cutting the flat food product in a direction transverse to the transport direction with the transverse cutting roller of (a).

\* \* \* \* \*